United States Patent
Suzuki et al.

(10) Patent No.: US 6,336,720 B1
(45) Date of Patent: Jan. 8, 2002

(54) HOT MELT INK AND INK JET PRINTING APPARATUS

(75) Inventors: Makoto Suzuki; Yasuhiro Hattori; Takemi Yamamoto, all of Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/320,709

(22) Filed: May 27, 1999

(30) Foreign Application Priority Data

May 29, 1998 (JP) .......................................... 10-149441
Mar. 30, 1999 (JP) .......................................... 11-088165

(51) Int. Cl.[7] .................................................. B41J 2/01
(52) U.S. Cl. ........................................ 347/88; 347/100
(58) Field of Search ............................. 347/88, 95, 99, 347/100, 101, 155, 102, 156; 118/669; 101/129; 528/335

(56) References Cited

U.S. PATENT DOCUMENTS 5,441,567 A * 8/1995 Umise et al. ................ 118/669
5,455,326 A * 10/1995 Parker ......................... 528/335
6,070,525 A * 6/2000 Watanabe et al. ........... 101/129

* cited by examiner

Primary Examiner—Anh T. N. Vo
(74) Attorney, Agent, or Firm—Oliff & Berridge, PLC

(57) ABSTRACT

A hot melt ink which is applicable to an ink jet printing system where the hot melt ink is jetted out to a printing medium to form an image on the printing medium includes a binder which contains a hot melt composition; a coloring material which is dispersed in the binder; and a photo-curing composition. The binder as a dispersion medium is dispersed in the photo-curing composition in the form of grains and a surface of the hot melt ink is covered with the photo-curing composition when the hot melt ink is fixed on the printing medium. An ink jet printing apparatus includes a jetting device which jets the above hot melt ink melted by heat out to a printing medium to draw an image on the printing medium; and a light source for irradiating the hot melt ink on the printing medium which is jetted out from the jetting device to cure the photo-curing composition.

29 Claims, 2 Drawing Sheets

HOT MELT INK AND INK JET PRINTING APPARATUS

BACKGROUND OF THE INVENTION

1. Field of the Invention

The present invention relates to hot melt ink for an ink jet printing in which a melted ink is jetted out to form an image on a printing medium, and to an ink jet printing apparatus in which melted ink is jetted out to form an image.

2. Description of the Related Art

An ink jet printing apparatus, in which ink is jetted out to a printing medium and is fixed on the medium to form the desired image, is known. There are some types of ink applicable to the ink jet printing apparatus distinguished each other from the viewpoint of fixing mechanism. For example, there are a liquid-type-ink and a hot melt ink (solid-type-ink). The liquid-type-ink includes a solvent and is fixed on the printing medium with the solvent being evaporated. On the other hand, the hot melt ink includes a thermoplastic composition, such as a thermoplastic resin, which is used as a binder. The hot melt ink melted by heating is jetted out to the printing medium and fixed thereon by cooling.

In the liquid-type-ink, it is difficult to use pigment as coloring material, therefore, dye is forced to be used. However, the trouble is that dye is inferior to pigment in a weatherproof property. On the other hand, in the hot melt ink, since pigment can be dispersed into the binder of the ink, both pigment and dye are advantageously able to be chosen. Therefore, a good weatherproof property can be given to the hot melt ink by using pigment, if necessary.

However, the hot melt ink is usually inferior in flow property on the printing medium after the ink-jetting process, and is apt to be fixed so as to hold its shape after this process. If the ink is fixed only by cooling process after the ink-jetting process, the good fixing condition of the ink can not be gotten and some trouble, such as a deterioration in a coloring property of the image, is caused. Consequently, an additional process such as a process for heating or pressing the printing medium after the ink-jetting process is necessary to fix the ink in good condition. However, an adoption of the additional process unfortunately makes a size of the printing apparatus larger or makes the structure of the apparatus more complicated.

And furthermore, the hot melt ink mainly includes a hot melt composition, molecular weight thereof is comparatively low. Accordingly, the fixed ink is soft and it's wear resistance is not good, therefore, there is a possibility that a set-off, that is a phenomena that an ink on a sheet is transferred to the next sheet, is caused when the sheets on which printing images are formed are piled each other.

SUMMARY OF THE INVENTION

It is an object of the present invention to provide a hot melt ink which has a good fixing property.

According to a first aspect of the invention, a hot melt ink which is applicable to an ink jet printing system where the hot melt ink is jetted out to a printing medium to form an image on the printing medium includes: a binder which contains a hot melt composition; a coloring material which is dispersed in the binder; and a photo-curing composition, wherein the binder as a dispersion medium is dispersed in the photo-curing composition in the form of grains and a surface of the hot melt ink is covered with the photo-curing composition when the hot melt ink is fixed on the printing medium.

By the above invention, a flow property of the ink which has jetted out on the printing medium is improved. Accordingly, any fixing process such as process in which heat or pressure is given to the printing medium is not necessary and it is possible that the printing apparatus comes to be small and simple. Furthermore, the photo-curing composition which covers a surface of the ink is hard. Accordingly, wear resistance property of the ink comes to be good and the ink is prevented from setting-off.

According to a second aspect of the invention, a hot melt ink which is applicable to an ink jet printing system where the hot melt ink is jetted out to a printing medium to form an image on the printing medium includes: a binder which contains a hot melt composition; a coloring material which is dispersed in the binder; and a photo-curing composition, wherein the binder as a dispersion medium is dispersed in the photo-curing composition in the form of grains and a surface of the hot melt ink is covered with the photo-curing composition before the ink is fixed when the hot melt ink is jetted out to the printing medium.

By the above invention, a flow property of the ink which has jetted out on the printing medium is improved. Accordingly, any fixing process such as process in which heat or pressure is given to the printing medium is not necessary and it is possible that the printing apparatus comes to be small and simple. Furthermore, the photo-curing composition which covers a surface of the ink is hard. Accordingly, wear resistance property of the ink comes to be good and the ink is prevented from setting-off.

In the above invention, a thermoplastic resin may be used as the hot melt composition.

In the above invention, a wax may be used as the hot melt composition.

In the above invention, a diameters of the grain made of the binder may be set within the limits of 1 $\mu$m to 30 $\mu$m, more preferably, 2 $\mu$m to 20 $\mu$m.

In the above invention, a wavelength in which the photo-curing composition shows the highest photosensitivity may be within the limits of visible radiation.

According to the third aspect of the invention, an ink jet printing apparatus comprises: a jetting device which jets a hot melt ink melted by heat out to a printing medium to draw an image on the printing medium; and a light source for irradiating the hot melt ink on the printing medium which is jetted out from the jetting device to cure a photo-curing composition included in the hot melt ink, wherein a binder of the hot melt ink as a dispersion medium is dispersed in the photo-curing composition in the form of grains and a surface of the hot melt ink is covered with the photo-curing composition when the hot melt ink is fixed on the printing medium.

By the above invention, the ink jet printing apparatus is provided with a jetting device which for jetting a hot melt ink out to a printing medium to draw an image on the printing medium; and a light source for irradiating the hot melt ink on the printing medium which is jetted out from the jetting device to cure a photo-curing composition included in the hot melt ink. Accordingly, the ink jet printing apparatus can become compact and simple.

DETAILED DESCRIPTION OF THE PREFERRED EMBODIMENTS

Figure 1:
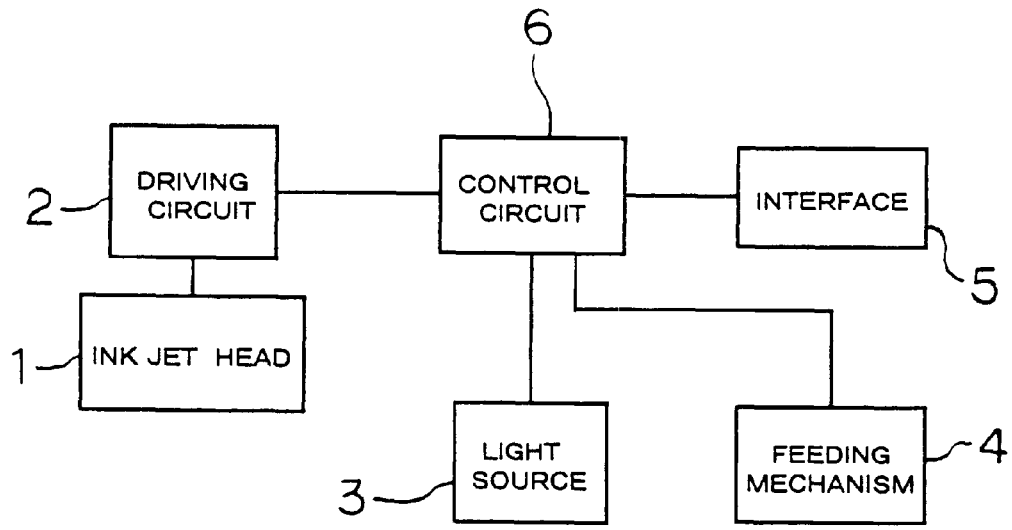
FIG. 1 is a block diagram showing an embodiment of a ink jet printing apparatus to which the present invention is applied.

The preferred embodiment of the present invention will now be explained below with reference to the attached drawings.

A hot melt ink, to which the present invention is applied, is applicable to an ink jet printing method, in which the ink is jetted out to a printing medium to draw an image. The hot melt ink is manufactured by mixing a binder which contains a hot melt composition; a coloring material dispersed in the binder; and a photo-curing composition.

The hot melt ink is fixed in the condition that the coloring material is dispersed in the binder which forms grains; and the photo-curing composition is fixed in the condition that grains made of the binder are covered with the photo-curing composition.

Functions of the binder are to hold the coloring material which is necessary for forming an image, and to adjust viscosity of the ink so that the ink is easy to be jetted out from a ink jet head when the ink is used for printing. The above photo-curing composition is used for improving a fixing property of the ink. To put it concretely, by using the photo-curing, the ink comes to be able to be fixed rapidly and completely through lower exposure.

In the hot melt ink to which the present invention is applied, the photo-curing composition has already covered the binder which holds the coloring material before the ink is fixed. Therefore, light radiated for fixing is hardly absorbed in the coloring material or the binder and is efficiently absorbed in the photo-curing composition.

It is to be desired that the hot melt composition used for the binder of the hot melt ink should have a suitable glass-transition temperature or melting temperature. In other words, the hot melt composition should be melt and its viscosity should be fully decreased through heat given by the ink jet head, and the hot melt composition shouldn't require high energy for melting the ink. On the other hand, the hot melt composition has to show the sufficient strength after fixing of the ink. It is also desirable that the coloring material is easy to be dispersed in the hot melt composition. And furthermore, the hot melt composition has good heat resistance property, and is easy to be fixed on the printing medium, preferably. For example, a thermoplastic resin, fatty acid, wax or the like can be used as the hot melt composition.

For example, polyamide resin is suitable as the thermoplastic resin, because the coloring material is easy to be dispersed in polyamide resin, and this resin has good heat resistance property and is easy to be fixed on various printing mediums. To give actual examples, Tohmide 90, Tohmide 92, Tohmide 391, Tohmide 394, Tohmide 394N, Tohmide 395, Tohmide 397, Tohmide 509, Tohmide 535, Tohmide 558, Tohmide 560, Tohmide 575, Tohmide 1310, Tohmide 1350 ("Tohmide" is the trademark for polyamide resins manufactured by Fujikasei), Polymide S-40HA, Polymide S-40E, Polymide S-150, Polymide S-52, Polymide S-185, Polymide S-1510, Polymide S-1525, Polymide S-1635, Polymide S-1962, Polymide S-2007, Polymide S-2153 ("Polymide" is the trademark for polymide resins manufactured by Sannyoukasei), Versamid 335, Versamid 725, Versamid 744, Versamid 756, Versamid 930, Versamid 940 ("Versamid" is the trademark for polyamide resins manufactured by henkel hakusui) or the like can be used as polyamide resin.

When fatty acid or wax is used as the hot melt composition, it is desirable that the melting point of the composition is preferably 50–200 degrees Celsius and that the composition is stable against heat. For example, usual waxes such as petroleum wax; plant wax; animal wax; mineral wax; synthesis hydrocarbon; wax hydride; denatured wax; synthesis fat and oil wax (such as higher fatty acid); ketone wax; higher alcohol; hydroxystearic acid; fatty acid amide; ketone; amine; ester or polymerized wax can be used without limitation. More than one type of these waxes can be combined to be used.

In above waxes, paraffin wax or micro crystalline wax as petroleum wax; candelilla wax, carnauba wax, rice wax or hohoba solid wax as plant wax; beeswax, lanolin or spermaceti as animal wax; montan wax as mineral wax; Fischer-Tropsch wax or polyethylene wax as synthesis hydrocarbon; hardened caster oil or hardened caster oil derivative as wax hydride; montan wax derivative, paraffin wax derivative, micro crystalline wax deriative, polyethylene wax derivative as denatured wax; behenic acid, stearic acid, palmitic acid, myristic acid or lauric acid as synthesis fat and oil wax (such as higher fatty acid); distearylketone as ketone wax; stearyl alcohol or behenyl alcohol as higher alcohol; 12-hydroxystearic acid or 12-hydroxystearic acid derivative as hydroxystearic acid; lauric acid amid, stearic acid amid, oleic acid amid, erucic acid amid, ricinoleic acid amid, stearic acid ester amid, palmitic acid amid, behenic acid amid, brassidic acid amid, N-oleyl stearic acid amid, N-stearyl stearic acid amid, N-oleyl palmitic acid amid or N-stearyl erucic acid amid as fatty acid amide; stearone or laurone as ketone; dodecyl amine, tetradecyl amine or octadecyl amine as amine; stearic acid methyl, stearic acid octadecyl, glycerine fatty acid ester, sorbitan fatty acid ester, propylene glycol fatty acid ester, ethylene glycol fatty acid ester or polyoxyethylene fatty acid ester as ester; and α-oleofine maleic anhydride copolymer wax as polymerized wax can be preferably used, respectively.

Each hot melt composition mentioned above is able to be used independently. From among these compositions, more than one species can be suitably chosen to be combined and mixed, also. For example, each thermoplastic resins can be used independently, and more than one species can be chosen from among these thermoplastic resins, to be mixed and used. Each wax can be used independently, and more than one species can be chosen from among these waxes, to be mixed and used, also. And furthermore, the thermoplastic resin and the wax are preferably mixed to be use.

As the coloring material used for the hot melt ink, it is possible to choose freely a pigment and a dye which are usually used for oil based inks.

As the pigment, both the organic pigment or inorganic pigment which generally used in the printing field can be used. To give actual examples, the usual pigments such as carbon black, cadmium red, molybdenum red, chrome yellow, cadmium yellow, titan yellow, chromium oxide, viridian, titan-cobalt green, ultramarine blue, Prussian blue, cobalt blue, azo pigment, phthalocyanine pigment, quinacridone pigment, isoindolinone pigment, dioxazine pigment, indanthrene pigment, perylene, perinone, thioindigo pigment, quinophthalone pigment or metal complex pigment can be used without limitation. Each pigment mentioned above is able to be used independently. From among these pigments, more than one species can be suitably chosen to be combined and mixed, also. Using of the pigment makes weather-resistant property of the ink better because weather-resistant of the pigment is generally excellent.

As the dye, the oil soluble dyes such as azo dye, disazo dye, metal complex dye, naphthol dye, anthraquinone dye, indigo dye, carbonium dye, quinonimine dye, cyanine dye, quinoline dye, nitro dye, nitroso-color, benzoquinone dye, naphthoquinone dye, xanthene dye, phthalocyanine dye, metal phthalocyanine dye or the like are preferably used. Each dye mentioned above is able to be used independently. From among these dyes, more than one species can be suitably chosen to be combined and mixed, also.

The contents of the pigment or dye used as the coloring material in the ink should be within the limits of 0.1 to 10 percent by weight so that the coloring material displays its ability to the full. The contents are preferably within the range of 0.5 to 8 percent by weight from the viewpoint of a coloring property when a printing is carried out by a printer. When the contents are within the range of 1 to 5 percent by weight, the aggregation of the pigments by heating owing to an operation of the printer is prevented from being caused and the dye is prevented from being deposited from the ink. Therefore, it is more preferable that the contents are established within this range.

The photo-curing composition used for the hot melt ink may have especially high photo-curing sensitivity in visible radiation. The photo-curing composition at least includes a polymerizing composition and a polymerization initiator. The polymerization initiator generates free radical with absorbing radiation. The polymerizing composition polymerizes itself by chain reaction with getting free radical. Viscosity of the photo-curing composition is increased by the progressing of the polymerization reaction and the polymerizing composition is finally cured.

The polymerization initiator triggers off or promotes the polymerization reaction of the polymerizing composition with receiving light energy. As the polymerization initiator, aromatic carbonyl compound, acetophenone, organic peroxide, diphenyl halonium salt, organic halide, substituted-S-triazine, triaryl imidazole dimer, azo compound, dye borate complex, metal arene complex, titanocene compound or the like is able to be used.

As the polymerization initiator, benzophenone, benzil, xanthone, thioxanthone, anthraquinone, acetophenone, 2,2-dimethyl-2-morpholino-4'-methylthioacetophenone, benzoylperoxide, 3,3',4,4'-tetrakis (t-butyldioxycarbonyl) benzophenone, diphenyliodonium bromide, diphenyliodonium chloride, carbon tetrachloride, carbon tetrabromide, 2,4,6-tris-trichlororomethyl-S-triazine or iron arene complex can be preferably used. Each polymerization initiator is able to be used independently. From among these polymerization initiators, more than one species can be suitably chosen to be combined and mixed, also.

The contents of the polymerization initiator may be within the range of 0.1 to 20 percent, and preferably 1 to 10 percent of the polymerizing composition by weight. Generally, polymerization reaction is difficult to trigger when the contents isn't more than 1 percent, and photosensitivity isn't improved any longer when the contents is increased over 10 percent.

As the polymerizing composition, compounds which has ethylene series unsaturation radical or epoxy radical are able to be used. As the compositions which has ethylene unsaturation radical, for example, acrylic acid, acrylic acid salt, acrylic ester, acrylamide, methacrylic acid, methacrylic acid salt, methacrylate, methacrylamide, maleic anhydride, maleate, itaconic acid ester, styrene, vinyl ether, vinyl ester, N-vinyl heterocyclic ring, allyl ether, allyl ester or these derivative can be used. As the compounds which has the epoxy radical, condensation product of bisphenol A and epichlorohydrine, condensation product of tetrabromo bisphenol A and epichlorohydrine or condensation product of cresol novolak and epichlorohydrine can be used. As the polymerizing composition, more than one of these compound can also be mixed to be used. However, since the rate of polymerization should be high, at least acrylic ester is preferably contained in the mixture to increase the rate of polymerization.

The photo-curing composition preferably includes at least one composition among pentaerythritol triacrylate, dipentaerythritol hexaacrylate, dipentaeryuthritol caprolactone addition product hexaacrylate, trimethylol-propane-triacrylate or trimethylol-propane propylene oxide addition product triacrylate. Each composition belongs to acrylic ester group indicates a high rate of polymerization reaction and has more than three acryloyl radical.

For the purpose of increasing the photo-curing sensitivity of the photo-curing composition, a sensitizer such as amine, sulfinic acid, sulfinic acid ester, sulphone, phosphine, phosphite, polythiol compound or the like can be used.

When only the polymerizing composition and the polymerization initiator are used, the wavelength in which the photo-curing shows the maximum sensitivity belongs to ultraviolet wavelength. In such a case, an ultraviolet lamp should be used for fixing the hot melt ink because of matching the wavelength of light radiated from the lamp with the sensitivity property of the photo-curing composition which is used for the ink. However, for miniaturizing the printing apparatus, it is necessary to use small-sized exposure light source such as light emitting diode, laser diode, vacume fluorescence display (vacume fluoresence element) or electro-luminescent lamp. Therefore, the sensitivity of the photo-curing composition in the wavelength corresponding to visible radiation should preferably come to be high. To meet such a demand, adding of the sensitizer to the photo-curing composition is able to control the sensitivity of the photo-curing composition so as to get high sensitivity in the wavelength area of visible radiation which is radiated from the light source used for the printing apparatus.

To get the photo-curing composition which has the sensitivity in light of blue wavelength band, that is of about 450 nm wavelength, azo dye, anthraquinone dye, methine dye, quinoline dye, cyanine dye, merocyanine dye, oxonol dye, styryl dye, base styryl dye, coumarin dye, keto coumarin dye, stilbene dye or the like are preferably used as the sensitizer.

To get the photo-curing composition which has the sensitivity in light of green wavelength band, that is of about 550 nm wavelength, azo dye, anthraquinone dye, indigoid dye, carbonium dye, methine dye, cyanine dye, merocyanine dye, oxonol dye, styryl dye, stilbene dye, rhodamine dye or the like are preferably used as the sensitizer.

To get the photo-curing composition which has the sensitivity in light of red wavelength band, that is of about 650 nm wavelength, anthraquinone dye, phthalocyanine dye, carbonium dye, quinonimine dye, methine dye, cyanine dye, merocyanine dye, rhodacyanine dye, oxonol dye, squarylium dye or the like are preferably used as the sensitizer.

Each sensitizer mentioned above can be used independently. More than one species of these sensitizer can also be used, for example, when the sensitive wavelength band should be made broader.

The photo-curing composition may include a stabilizer such as thermal polymerization inhibitor, suitable solvent to improve compatibility or the like.

The following is an explanation for the production method of the hot melt ink to which the invention is applied.

Since the above hot melt composition is in a solid state at ordinary temperature, first of all, the hot melt composition is heated to be melted. The coloring material is added to the melted hot melt composition and this mixture is agitated to disperse the coloring material into the hot melt composition. This mixture is next cooled to get an ink base. By crushing the ink base or spray-drying the ink base melted by a heating process, a granular hot melt composition is gotten. Through the production method mentioned above, the granular hot melt composition whose size is comparatively large can be gotten; the grain size is usually not smaller than 10 $\mu$m. The photo-curing composition is separately prepared in a dark room. The hot melt ink can be also manufactured by mixing the above granular hot melt composition into the liquid photo-curing composition which gets liquid by a heating process or is originally liquid at ordinary temperature.

As another process method, the emulsification method can be used. By mixing the ink base heated to a temperature over its melting point with the photo-curing composition, these compositions are separated from each other to make two layers. Agitating these compositions which forms the layers by an agitation apparatus or emulsification apparatus gives an mixture in emulsification condition, in which grains or droplets of the hot melt composition are dispersed in the photo-curing composition which gets liquid.

To get such an emulsification condition, the ratio of the hot melt composition to the photo-curing composition is preferably within the range of from 1:0.5 to 1:3 by weight. When the ratio is decreased below this range, there is the possibility that the relation of the photo-curing composition and the hot melt composition is reversed about the emulsification condition. On the other hand, when the ratio is increased above this range, there is possibility that it is difficult to make the ink be jet out from the ink jet head because the percentage of the hot melt composition is too small to fully decrease viscosity of the hot melt ink when it is heated and melted. Through the emulsification method, it is possible to produce comparably small grains of the hot melt composition, whose diameters are not larger than 10 $\mu$m, and to disperse the small grains of the hot melt composition into the photo-curing composition.

The size of the ink-droplet jetted out by the ink jet printing apparatus depends on a nozzle size of the ink jet head or driving condition of the nozzle. The diameter of the ink-droplet is usually set within the limits between 20 $\mu$m and 70 $\mu$m. Accordingly, the diameter of the grain of the hot melt composition as a dispersed face is set between 1 $\mu$m and 30 $\mu$m. If the diameter of the grains is smaller than 1 $\mu$m, the coloring material included in the dispersed face may be short. If the diameter is larger than 30 $\mu$m, some ink-droplet may include no grains of the hot melt composition. The grains of the hot melt composition of the suitable size mentioned above can be gotten by controlling a jetting force, shear force, agitating force or the like of the apparatus such as a spray dryer for the spray-drying, the agitation apparatus or the emulsification apparatus. The diameter of the grains can be adjusted by adding a dispersant or emulsifier, if necessary.

Therein after, an embodiment of an ink jet printing apparatus in which the above-mentioned hot melt ink is used and a fixing mechanism of the ink will be explained.

Figure 2:
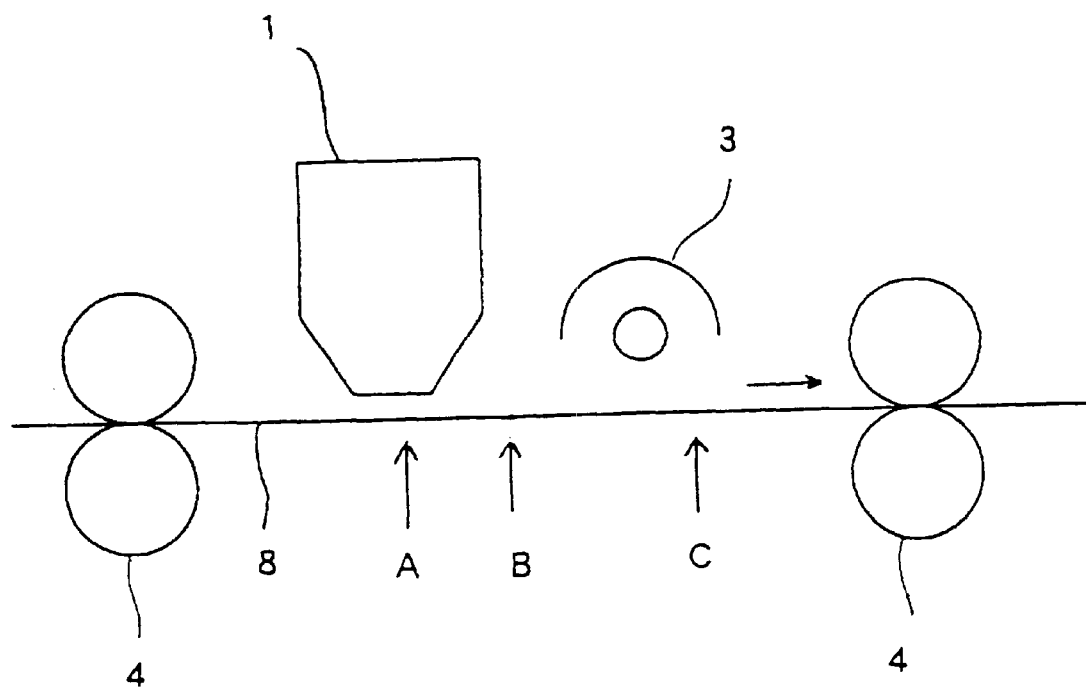
FIG. 2 is a view showing a structure of the embodiment of the ink jet printing apparatus.

As shown in FIGS. 1 and 2, an ink jet head 1 is driven by the driving circuit 2, to jet out the hot melt ink melted by heat toward a printing medium 8 for drawing a image on the printing medium 8. A light source 3 irradiates the hot melt ink which is jutted out on the printing medium 8 to cure the photo-curing composition in the hot melt ink. A feeding mechanism 4 feeds the printing medium 8 in the direction from ink jet head 1 to the light source 3. An interface 5 exchanges data which is transmitted from or to an outer apparatus such as a personal computer. A control circuit 6 is connected to the driving circuit 2, the light source 3, the feeding mechanism 4 and the interface 5, respectively. The control circuit 6 controls an operations of the ink jet printing apparatus.

Figure 3A:
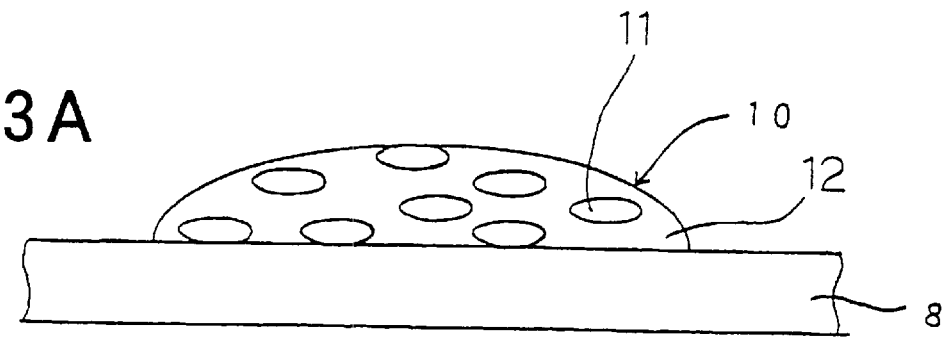
FIGS. 3A–3C are views showing a fixing mechanism in an embodiment of a hot melt ink.

The operation of the ink jet printing apparatus and the fixing mechanism of the ink will be explained by referring to FIGS. 2 and 3. Jetting out the ink melted by heat from the ink jet head 1 in proper timing can make an image on the printing medium 8, while the printing medium 8 is being fed in the direction from the left side to the right side of FIG. 2. In FIG. 3A, the condition of the ink in the position "A" of FIG. 2 is shown. In this time, immediately after the ink 10 is jetted out, the ink 10 is not fixed yet by cooling. However, the ink 10 contains the grains 11 of the binder (the hot melt composition) in which the coloring materials (pigments) are dispersed and the photo-curing composition 12 which covers the grains 11 of the binder.

Figure 3B:
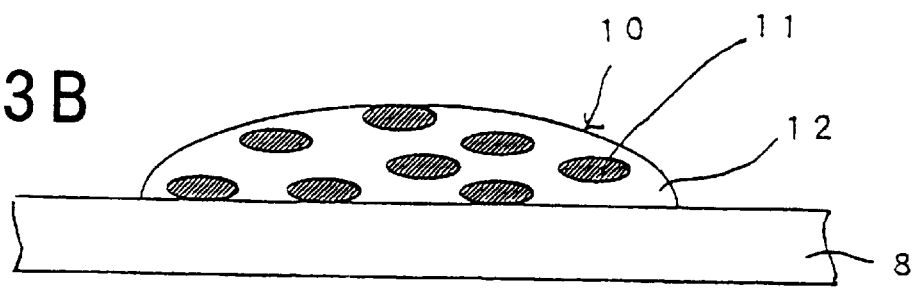

When the part of the image comes to the position "B" of FIG. 2 by continuing to feed the printing medium 8 through the feeding mechanism 4, as shown in FIG. 3B, the temperature of the whole ink 10 is decreased by self-cooling. When the temperature is lower than the melting point of the hot melt composition, the grains 11 of the binder which includes the hot melt composition get solid. In this time, the coloring material is held and dispersed in the grains 11 of the binder. On the other hand, the photo-curing composition 12 is kept in a liquid state in spite of cooling.

Figure 3C:
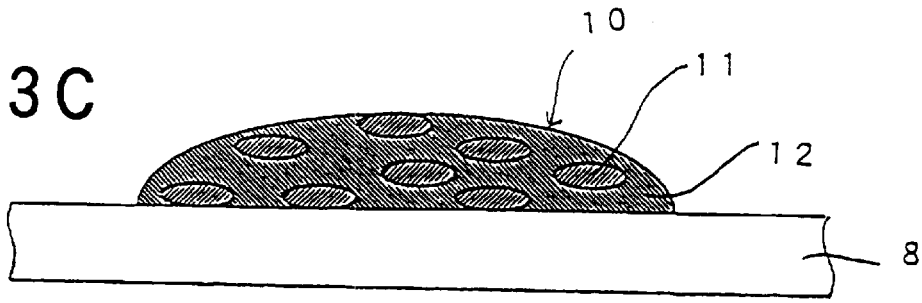

When the part of the image comes to the light source 3, the ink 10 is irradiated by light from the light source 3 and the photo-curing composition 12 of the ink 10 is cured. As shown in FIG. 3C, when the part of the image comes to the position "C" of FIG. 2, the photo-curing composition 12 is cured and the ink 10 is fixed in the condition that the photo-curing composition 12 covers the grains 11 of the binder. The wavelength of light radiated from the light source 3 is preferably fit for the sensitizing property of the photo-curing composition 12.

As shown in FIG. 3C, the surface of the ink 10 is covered with the photo-curing composition 12. The coloring property of the ink 10 is good, because the photo-curing composition 12, which covers the surface of the ink 10 as stated above, has normally high refractive index.

Since viscosity of the photo-curing composition 12 is relatively low before the ink 10 is exposed to the curing process, the ink 10 is leveled quickly. And the surface of the ink 10 becomes flat until the ink 10 is fixed finally so that the fixing condition of the hot melt ink to which the invention is applied is better than that of usual inks.

The photo-curing composition which forms the surface of the cured ink belongs to a cross-linked polymer. Therefore, the property showed by this hot melt ink is far better than the usual hot melt inks which are not including a photo-curing composition, about the strength and the wear resistance after fixing.

In the hot melt ink to which the invention is applied, the leveling process is easy to advance as stated above. Therefore, the hot melt ink can show the fully good fixing property even when the ink have to be fixed without the help of permeating through the printing medium, for example, when the printing medium is made of metal or OHP sheet and isn't made of material such as paper through which the ink is easy to permeate.

As the result of using the hot melt ink to which the invention is applied, the ink jet printing apparatus doesn't need to be provided with a mechanism to improve fixing property of the ink such as a heating-role. This ink jet printing apparatus needs only the light source, the structure of which is comparatively small and simple. Accordingly, this ink jet printing apparatus has the advantage of being compact and rarely out of order. The ink jet printing apparatus may be however provided with some mechanism or the like such as apparatus to give heat or pressure to the part of the image on the printing medium in addition, to improve fixing property of the ink.

In FIG. 3B, the case where the grains 11 of the binder are in solid states by cooling before the photo-curing composition 12 begins to harden is shown. However, the photo-curing composition 12 may be cured by irradiation before the grains 11 of the binder is harden by cooling.

The ink jet head 1 above mentioned corresponds to the jetting device.

EXAMPLE

There in after, an example of the hot melt ink to which the invention is applied will be explained below. In this example, a mixture of polyamide resin, fatty acid wax and ketone wax as a hot melt binder, dipentaerythritol polyacrylate as a polymerizing composition, iron arene complex as a polymerization initiator, 2,6-diisopropyl-N,N-dimethylaniline as a polymerization sensitizer, keto coumarin dye as a wavelength-intensifying coloring matter, azolake yellow as a pigment are used, respectively. In Table 1, the weight ratio of these composition is shown.

TABLE 1

| Composition | Ratio by weight |
| --- | --- |
| Polyamide resin | 30 |
| Fatty acid wax | 15 |
| Ketone wax | 40 |
| Dipentaerythritol polyacrylate | 35 |
| Iron arene complex | 7 |
| 2,6-diisopropyl-N,N-dimethylaniline | 4 |
| Keto coumarin dye | 5 |
| Azolake yellow | 3 |

An production method will be next explained. At the start, polyamide resin, fatty acid wax and ketone wax were heated at the temperature of 100 to 200 degrees Celsius and they were melted. The above pigment was added to them and the mixture was agitated with a dissolver at a rotational speed of 500 to 5000 rpm, and after that an ink base was gotten by cooling and hardening the mixture. Next, a photo-curing composition was prepared. To put it concretely, the above polymerizing composition, the polymerization initiator, the polymerization sensitizer and the wavelength-intensifying coloring matter were weighted under safety light (red light) in a darkroom and were mixed at the temperature of 70 degrees Celsius.

After that the above ink base was heated and melted and the melted ink base was jetted by a spray dryer to get grains of the ink base. The size of the grain could be controlled by adjusting a revolution speed of the spray dryer. The size of the grain was measured with a light microscope. The hot melt ink was gotten by mixing this grains and the above photo-curing composition (experimental numbers 1 to 3).

The above ink base was again heated to be melted, and the above photo-curing composition was added to the ink base. And the mixture in which this two liquid was separated each other to make two layers was agitated with a homogenizer. Therefore, the ink base, that is the hot melt composition including the pigment, was dispersed into the photo-curing composition. The size of the droplet of the hot melt composition could be controlled by adjusting the revolution speed within the limits of 1000 to 5000 rpm and the length of an agitating time within the limits of 3 to 10 minutes (experimental numbers 2 to 4). The size of the droplet of the hot melt composition was measured with the light microscope. The hot melt ink, in which the hot melt composition including the pigment was dispersed in the photo-curing composition, was made by cooling the mixture agitated as stated above to an ordinary temperature.

All the eight hot melt inks (experimental numbers 1 to 8) prepared through the above production method were yellow inks. The melting points of them were 110 degrees Celsius. Viscosity of them at the temperature of 110 degrees Celsius were 16 mPa·S. The range of a wavelength where these inks showed photo-curing sensitivity was about 400 to 600 nm and the inks had specially high photo-curing sensitivity in visible radiation, which corresponds to the wavelength of about 450 nm.

These inks were applied to the ink jet printing apparatus shown in FIG. 1 and FIG. 2 and were jetted out to a polyester film as a printing medium. The feeding speed of the printing medium was 3 m/min when the inks was jetting out, which corresponds the case when ten sheets of paper whose size is A4 are outputted from the printing apparatus per a minute. A 300-watt halogen lamp 3, as a light source for curing, was set above the printing medium at the interval of 600 mm from the printing medium. When light was radiated from the lamp 3, illumination intensity at the surface of the printing medium was stronger than 10,000 lux in an area which extends over one meter in the feeding direction of the printing medium. Illumination intensity at the position right under the lamp 3 was about 15,000 lux.

The reflection optical density (OD) was measured about the part of the ink fixed on the printing medium by irradiation. The diameter of the ink-droplet was about 70 μm when it was jetted out to the printing medium. Furthermore, the pencil hardness test (JIS K5400) was carried out to evaluate the degree of intensity of the fixed ink.

In Table 2, for each inks of experimental numbers 1 to 8, an average diameter (Dm) of grains of the binder in the ink-droplet, reflection optical density (OD) and a pencil hardness of the fixed ink is shown.

TABLE 2

| Experimental number | Average diameter of grains of binder Dm(μm) | Pencil hardness | Optical density (OD) | Evaluation as hot melt ink |
| --- | --- | --- | --- | --- |
| 1 | 50 | 2B | 1.20 | Poor |
| 2 | 34 | B | 1.15 | Inadequate |
| 3 | 22 | 2H | 1.18 | Good |
| 4 | 13 | 2H | 1.12 | Good |
| 5 | 9.6 | 2H | 1.15 | Good |
| 6 | 2.8 | 2H | 1.12 | Good |
| 7 | 1.3 | 2H | 0.83 | Inadequate |
| 8 | 0.85 | 2H | 0.56 | Poor |

As shown in Table 2, in experimental number 1 or 2, each pencil hardness is "2B" or "B", respectively, and this shows that the degree of intensity is not enough in each ink. In these inks, photo-curing sensitivity probably comes to be short for the whole inks, because the size of the dispersion medium is so large that the ratio of the photo-curing composition included in the ink is short or because decreasing of light radiated toward the photo-curing composition is caused by light-absorption of the pigment in the binder.

It is desirable that reflection optical density is 1.0 or up, therefore, the ink of experimental number 8 is not suitable and the ink of experimental number 7 is not desirable, also. It is thought that the size of the dispersion mediums is so small that the ratio of the pigment is short in these inks.

On the other hand, it is desirable that the pencil hardness is "H" or up. The pencil hardness of usual hot melt inks which doesn't include photo-curing composition is "2B" or below. The pencil hardness of the ink of experimental number 2 is "B". So, this ink is harder than the above usual hot melt inks but can not be estimated to be enough hard. It is thought that the photo-curing composition isn't fully hardened because the diameter of the grains of the binder is too large, therefore, energy of exposure for fixing the ink is absorbed by the pigment in the binder and light energy coming to the photo-curing composition is accordingly short, in this case.

As the result, referring to FIG. 2, it is known that high performance adapted for the hot melt ink can be gotten when the diameter of the dispersion medium is in the range of about 1 $\mu$m to 30 $\mu$m, more preferably 2 $\mu$m to 20 $\mu$m.

What is claimed is:

1. A hot melt ink which is applicable to an ink jet printing system where the hot melt ink is jetted out to a printing medium to form an image on the printing medium including:
   a binder which contains a hot melt composition, wherein the hot melt composition is meltable by heating;
   a coloring material which is dispersed in the binder; and
   a photo-curing composition,
   wherein the binder as a dispersion medium is dispersed in the photo-curing composition in the form of grains and a surface of the hot melt ink is covered with the photo-curing composition when the hot melt ink is fixed on the printing medium, wherein the hot melt ink is jetted when in liquid form after being melted.

2. A hot melt ink according to claim 1, wherein a thermoplastic resin is used as the hot melt composition.

3. A hot melt ink according to claim 2, wherein a diameter of the grain made of the binder is set within limits of 1 $\mu$m to 30 $\mu$m.

4. A hot melt ink according to claim 3, wherein a wavelength in which the photo-curing composition shows the highest photosensitivity is within limits of visible radiation.

5. A hot melt ink according to claim 2, wherein a diameter of the grain made of the binder is set within limits of 2 $\mu$m to 20 $\mu$m.

6. A hot melt ink according to claim 5, wherein a wavelength in which the photo-curing composition shows the highest photosensitivity is within limits of visible radiation.

7. A hot melt ink according to claim 2, wherein a wavelength in which the photo-curing composition shows the highest photosensitivity is within limits of visible radiation.

8. A hot melt ink according to claim 1, wherein a wax is used as the hot melt composition.

9. A hot melt ink according to claim 8, wherein a wavelength in which the photo-curing composition shows the highest photosensitivity is within limits of visible radiation.

10. A hot melt ink according to claim 1, wherein a diameter of the grain made of the binder is set within the limits of 1 $\mu$m to 30 $\mu$m.

11. A hot melt ink according to claim 10, wherein a wavelength in which the photo-curing composition shows the highest photosensitivity is within limits of visible radiation.

12. A hot melt ink according to claim 1, wherein a diameter of the grain made of the binder is set within limits of 2 $\mu$m to 20 $\mu$m.

13. A hot melt ink according to claim 12, wherein a wavelength in which the photo-curing composition shows the highest photosensitivity is within limits of visible radiation.

14. A hot melt ink according to claim 1, wherein a wavelength in which the photo-curing composition shows the highest photosensitivity is within limits of visible radiation.

15. A hot melt ink which is applicable to an ink jet printing system where the hot melt ink is jetted out to a printing medium to form an image on the printing medium including:
    a binder which contains a hot melt composition, wherein the hot melt composition is meltable by heating;
    a coloring material which is dispersed in the binder; and
    a photo-curing composition,
    wherein the binder as a dispersion medium is dispersed in the photo-curing composition in the form of grains and a surface of the hot melt ink is covered with the photo-curing composition before the ink is fixed when the hot melt ink is jetted out to the printing medium, wherein the hot melt ink is jetted when in liquid form after being melted.

16. A hot melt ink according to claim 15, wherein a thermoplastic resin is used as the hot melt composition.

17. A hot melt ink according to claim 16, wherein a diameter of the grain made of the binder is set within limits of 1 $\mu$m to 30 $\mu$m.

18. A hot melt ink according to claim 17, wherein a wavelength in which the photo-curing composition shows the highest photosensitivity is within limits of visible radiation.

19. A hot melt ink according to claim 16, wherein a diameter of the grain made of the binder is set within limits of 2 $\mu$m to 20 $\mu$m.

20. A hot melt ink according to claim 19, wherein a wavelength in which the photo-curing composition shows the highest photosensitivity is within limits of visible radiation.

21. A hot melt ink according to claim 16, wherein a wavelength in which the photo-curing composition shows the highest photosensitivity is within limits of visible radiation.

22. A hot melt ink according to claim 15, wherein a wax is used as the hot melt composition.

23. A hot melt ink according to claim 22, wherein a wavelength in which the photo-curing composition shows the highest photosensitivity is within limits of visible radiation.

24. A hot melt ink according to claim 15, wherein a diameter of the grain made of the binder is set within limits of 1 $\mu$m to 30 $\mu$m.

25. A hot melt ink according to claim 24, wherein a wavelength in which the photo-curing composition shows the highest photosensitivity is within limits of visible radiation.

26. A hot melt ink according to claim 15, wherein a diameter of the grain made of the binder is set within limits of 2 $\mu$m to 20 $\mu$m.

27. A hot melt ink according to claim 26, wherein a wavelength in which the photo-curing composition shows the highest photosensitivity is within limits of visible radiation.

28. A hot melt ink according to claim 15, wherein a wavelength in which the photo-curing composition shows the highest photosensitivity is within limits of visible radiation.

29. An ink jet printing apparatus comprising:
- a jetting device which jets a hot melt ink melted by heat out to a printing medium to draw an image on the printing medium; and
- a light source for irradiating the hot melt ink on the printing medium which is jetted out from the jetting device to cure a photo-curing composition included in the hot melt ink, wherein a binder of the hot melt ink as a dispersion medium is dispersed in the photo-curing composition in the form of grains and a surface of the hot melt ink is covered with the photo-curing composition when the hot melt ink is fixed on the printing medium, wherein the hot melt ink is jetted when in liquid form after being melted.

* * * * *